United States Patent
Peng et al.

(10) Patent No.: US 11,803,056 B2
(45) Date of Patent: Oct. 31, 2023

(54) WAVEGUIDED DISPLAY SYSTEMS

(71) Applicant: Apple Inc., Cupertino, CA (US)

(72) Inventors: Guolin Peng, Santa Clara, CA (US); Eric J. Hansotte, Morgan Hill, CA (US); Francesco Aieta, San Francisco, CA (US); Graham B. Myhre, San Jose, CA (US); Hyungryul Choi, San Jose, CA (US); Nan Zhu, San Jose, CA (US); Paul J. Gelsinger-Austin, Santa Clara, CA (US); Se Baek Oh, Millbrae, CA (US); Scott M. DeLapp, Sunnyvale, CA (US); Bradley C. Steele, San Diego, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 16/546,157

(22) Filed: Aug. 20, 2019

(65) Prior Publication Data
US 2020/0089014 A1 Mar. 19, 2020

Related U.S. Application Data

(60) Provisional application No. 62/731,309, filed on Sep. 14, 2018.

(51) Int. Cl.
G02B 27/01 (2006.01)
G02B 27/12 (2006.01)
G02B 27/14 (2006.01)

(52) U.S. Cl.
CPC ......... *G02B 27/0172* (2013.01); *G02B 27/12* (2013.01); *G02B 27/14* (2013.01); *G02B 2027/0174* (2013.01)

(58) Field of Classification Search
CPC .... G02B 27/0172; G02B 27/12; G02B 27/14; G02B 2027/0174; G02B 6/34; G02B 27/1086; G02B 27/142; G02B 27/0101
See application file for complete search history.

(56) References Cited

U.S. PATENT DOCUMENTS 5,076,664 A 12/1991 Migozzi
5,136,426 A * 8/1992 Linden ................. H04N 9/3129
348/196
(Continued)

FOREIGN PATENT DOCUMENTS

CN 1559000 A 12/2004
CN 1650215 A 8/2005
(Continued)

OTHER PUBLICATIONS

Wikipedia webpage "Beam splitter" (Year: 2018).*

*Primary Examiner* — George G. King
(74) *Attorney, Agent, or Firm* — Treyz Law Group, P.C.; Michael H. Lyons

(57) ABSTRACT

An electronic device may have a display that emits image light, a waveguide, and an input coupler that couples the image light into the waveguide. Beam splitter structures may be embedded within the waveguide. The beam splitter structures may partially reflect the image light multiple times and may serve to generate replicated beams of light that are coupled out of the waveguide by an output coupler. The beam splitter structures may replicate the beams across two dimensions to provide an eye box with uniform-intensity light from the display across its area. The beam splitter structures may include stacked partially reflective beam splitter layers, sandwiched transparent substrate layers having different indices of refraction, a thick volume hologram interposed between substrate layers, or combinations of these or other structures. The reflectivity of the beam splitter structures may vary discretely or continuously across the lateral area of the waveguide.

17 Claims, 10 Drawing Sheets

(56) References Cited

U.S. PATENT DOCUMENTS

| | | | |
|---|---|---|---|
| 5,784,656 A | 7/1998 | Utagawa | |
| 5,818,618 A * | 10/1998 | Eastmond | H04B 10/803 398/164 |
| 5,854,697 A * | 12/1998 | Caulfield | G02B 6/005 359/34 |
| 5,882,773 A * | 3/1999 | Chow | H01J 1/70 428/212 |
| 8,333,476 B2 | 12/2012 | Ushigome et al. | |
| 8,666,208 B1 | 3/2014 | Amirparviz | |
| 9,581,762 B2 | 2/2017 | Wertsberger et al. | |
| 9,880,383 B2 | 1/2018 | Miyazaki et al. | |
| 9,946,076 B2 | 4/2018 | Smits et al. | |
| 10,317,679 B2 | 6/2019 | Ayres | |
| 10,330,937 B2 | 6/2019 | Cheng et al. | |
| 10,338,400 B2 | 7/2019 | Connor | |
| 10,345,519 B1 | 7/2019 | Miller | |
| 10,422,995 B2 | 9/2019 | Haddick | |
| 10,444,419 B2 | 10/2019 | Bhargava et al. | |
| 10,444,510 B1 | 10/2019 | Lee et al. | |
| 2004/0062502 A1 * | 4/2004 | Levola | G02B 27/0081 385/129 |
| 2006/0126179 A1 * | 6/2006 | Levola | G02B 27/4272 359/563 |
| 2011/0026128 A1 | 2/2011 | Baker et al. | |
| 2013/0250430 A1 * | 9/2013 | Robbins | G02B 27/0172 359/633 |
| 2013/0257832 A1 | 10/2013 | Hammond | |
| 2015/0109678 A1 | 4/2015 | Mukawa | |
| 2015/0323790 A1 | 11/2015 | Dominici et al. | |
| 2016/0363777 A1 * | 12/2016 | Flynn | G02B 30/33 |
| 2018/0059306 A1 | 3/2018 | Pan | |
| 2018/0067315 A1 | 3/2018 | Amitai et al. | |
| 2018/0106456 A1 * | 4/2018 | Aso | F21S 43/237 |
| 2018/0292599 A1 | 10/2018 | Ofir et al. | |
| 2019/0129168 A1 | 5/2019 | Tan | |

FOREIGN PATENT DOCUMENTS

| | | |
|---|---|---|
| CN | 1813213 A | 8/2006 |
| CN | 101730859 A | 6/2010 |
| CN | 103869406 A | 6/2014 |
| CN | 104216120 A | 12/2014 |
| CN | 104350411 A | 2/2015 |
| CN | 104737061 A | 6/2015 |
| CN | 106556929 A | 4/2017 |
| CN | 107193078 A | 9/2017 |
| CN | 107290816 A | 10/2017 |
| CN | 107329273 A | 11/2017 |
| CN | 107430275 A | 12/2017 |
| CN | 107643559 A | 1/2018 |
| CN | 107728253 A | 2/2018 |
| CN | 107783297 A | 3/2018 |
| CN | 107817556 A | 3/2018 |
| CN | 107918209 A | 4/2018 |
| CN | 107966820 A | 4/2018 |
| CN | 207424391 U | 5/2018 |
| CN | 108139587 A | 6/2018 |
| CN | 108235739 A | 6/2018 |
| CN | 108521794 A | 9/2018 |
| WO | 2015001839 A1 | 1/2015 |
| WO | 2015006784 A2 | 1/2015 |

* cited by examiner

WAVEGUIDED DISPLAY SYSTEMS

This application claims the benefit of provisional patent application No. 62/731,309, filed Sep. 14, 2018, which is hereby incorporated by reference herein in its entirety.

BACKGROUND

This relates generally to electronic devices and, more particularly, to electronic devices with displays.

Electronic devices with displays may be used to display content for a user. If care is not taken, the components used in displaying content for a user in an electronic device may be unsightly and bulky and may not exhibit desired levels of optical performance.

SUMMARY

An electronic device may have a display that emits image light, a waveguide, and an input coupler that couples the image light into the waveguide. Beam splitter structures may be embedded within the waveguide. The beam splitter structures may reflect the image light multiple times and may serve to generate replicated beams of light (e.g., expanded output light) that are coupled out of the waveguide by an output coupler. The beam splitter structures may replicate the beams across two dimensions (e.g., across the lateral area of the waveguide). In this way, an eye box may be provided with uniform-intensity light from the display across its area and for a wide field of view.

The beam splitter structures may include stacked beam splitter layers. For example, first and second partially reflective beam splitter layers may be embedded in the waveguide. The second beam splitter layer may partially or completely overlap the first beam splitter layer. Additional beam splitter layers may be stacked over the first and second beam splitter layers or laterally displaced with respect to the first and/or second beam splitter layers.

In another suitable arrangement, the beam splitter structures may be formed from first, second, and third transparent substrate layers of the waveguide. In this scenario, each transparent substrate layer may have a respective index of refraction so that interfaces between the substrate layers generate reflected light that is coupled out of the waveguide.

In yet another suitable arrangement, the beam splitter structures may include a thick volume hologram interposed between two transparent substrate layers. In this scenario, the thick volume hologram layer may partially reflect the image light at multiple depths relative to one of the substrate layers as the image light traverses the thickness of the thick volume hologram layer. Combinations of these arrangements may be used to form the beam splitter structures. If desired, the reflectivity of the beam splitter structures may vary discretely or continuously across the lateral area of the waveguide.

DETAILED DESCRIPTION

Electronic devices such as head-mounted devices and other devices may be used for augmented reality and virtual reality systems. These devices may include portable consumer electronics (e.g., portable electronic devices such as tablet computers, cellular telephones, glasses, other wearable equipment, etc.), head-up displays in cockpits, vehicles, etc., and display-based equipment (televisions, projectors, etc.). Devices such as these may include displays and other optical components. Device configurations in which virtual reality and/or augmented reality content is provided to a user with a head-mounted display device are described herein as an example. This is, however, merely illustrative. Any suitable equipment may be used in providing a user with virtual reality and/or augmented reality content.

A head-mounted device such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays or a scanning device in a display system to the eyes of a viewer. A waveguide such as a thin planar waveguide formed from one or more sheets of transparent material such as glass or plastic or other light guide may be included in the optical system to convey image light from the pixel arrays to the viewer.

The illumination system may include a light source that supplies illumination for the display. The illuminated display produces image light. An input optical coupler may be used to couple light from the light source into a waveguide in the illumination system. An output optical coupler may be used to couple display illumination out of the waveguide. Input and output couplers may also be used to couple image light from the display into a waveguide in the optical system and to couple the image light out of the waveguide for viewing by the viewer.

The input and output couplers for the head-mounted device may form structures such as Bragg gratings, prisms, angled transparent structures, and/or lenses that couple light into the waveguide and that couple light out of the waveguide. Input and output optical couplers may be formed from diffractive couplers such as volume holograms, other holographic coupling elements, or other diffractive coupling structures. The input and output couplers may, for example, be formed from thin or thick layers of photopolymers and/or other optical coupler structures in which holographic patterns are recorded using lasers. In some configurations, optical couplers may be formed from dynamically adjustable devices such as liquid crystal components (e.g., tunable liquid crystal gratings, polymer dispersed liquid crystal devices), or other adjustable optical couplers.

Figure 1:
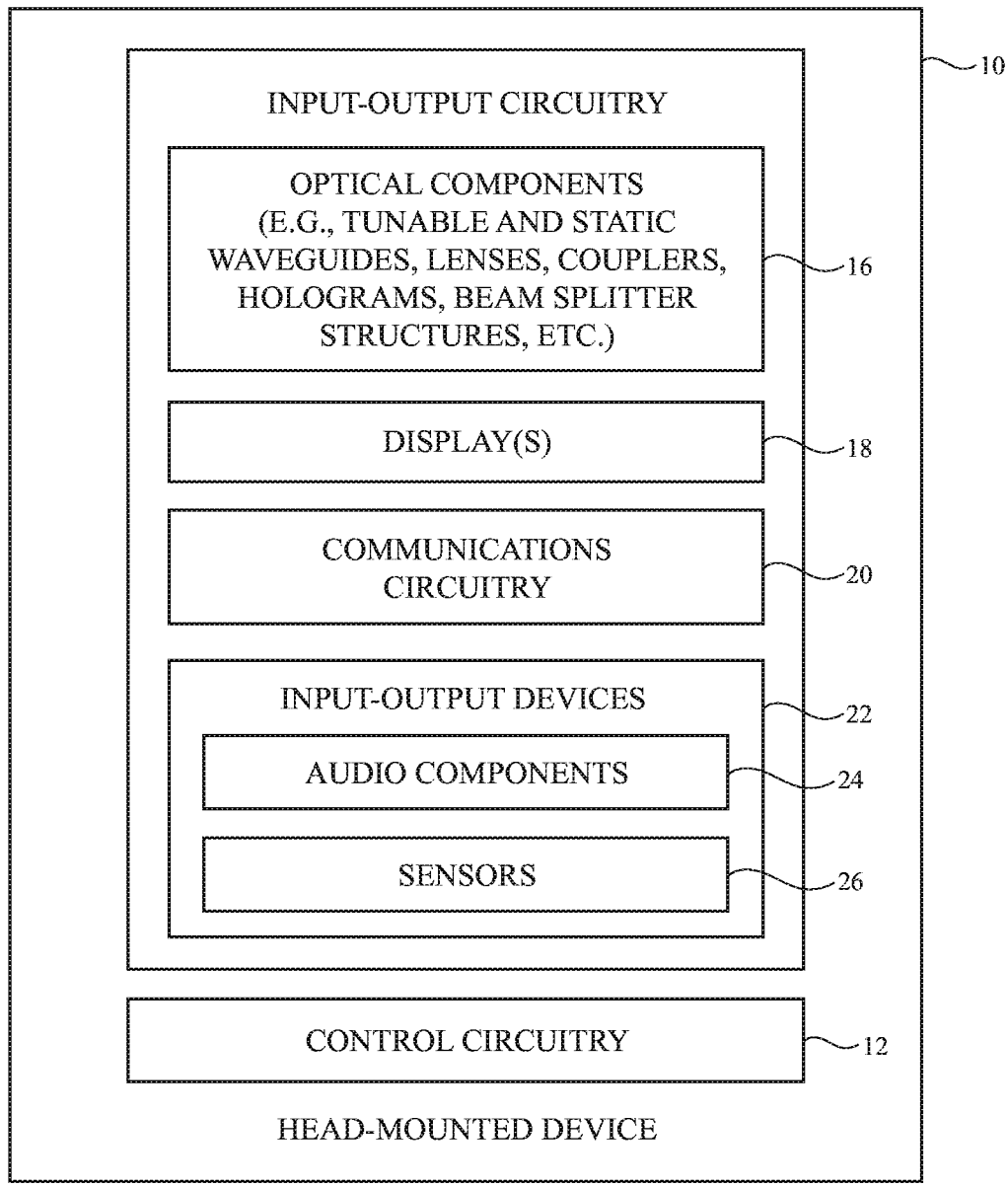
FIG. 1 is a schematic diagram of an illustrative head-mounted device in accordance with an embodiment.

A schematic diagram of an illustrative head-mounted device is shown in FIG. 1. As shown in FIG. 1, head-mounted device 10 may have control circuitry 12. Control circuitry 12 may include storage and processing circuitry for controlling the operation of head-mounted display 10. Circuitry 12 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement operations for head-mounted display 10 (e.g., data gathering operations, operations involving the adjustment of components using control signals, image rendering operations to produce image content to be displayed for a user, etc.).

Head-mounted device 10 may include input-output circuitry 14. Input-output circuitry 14 may be used to allow data to be received by head-mounted display 10 from external equipment (e.g., a tethered computer, a portable device such as a handheld device or laptop computer, or other electrical equipment) and to allow a user to provide head-mounted device 10 with user input. Input-output circuitry 14 may also be used to gather information on the environment in which head-mounted device 10 is operating. Output components in circuitry 14 may allow head-mounted device 10 to provide a user with output and may be used to communicate with external electrical equipment.

As shown in FIG. 1, input-output circuitry 14 may include one or more displays such as display(s) 18. Display(s) 18 may be used to display images for a user of head-mounted device 10. Display(s) 18 have pixel array(s) or laser scanning patterns to generate images that are presented to a user through an optical system. The optical system may, if desired, have a transparent portion through which the user (viewer) can observe real-world objects while computer-generated content is overlaid on top of the real-world objects by producing computer-generated images on the display(s) 18.

Optical components 16 may be used in forming the optical system that presents images to the user. Components 16 may include static components such as waveguides, beam splitter structures embedded in waveguides, static optical couplers, and fixed lenses. Components 16 may also include adjustable optical components such as an adjustable polarizer, tunable lenses (e.g., liquid crystal tunable lenses, tunable lenses based on electrooptic materials, tunable liquid lenses, or other tunable lenses), a dynamically adjustable coupler (e.g., an adjustable MEMs grating or other coupler), an adjustable liquid crystal holographic coupler such as an adjustable liquid crystal Bragg grating coupler, adjustable holographic couplers (e.g., electro-optical devices such as tunable Bragg grating couplers, polymer dispersed liquid crystal devices, etc.), couplers, lenses, and other optical devices formed from electro-optical materials (e.g., lithium niobate or other materials exhibiting the electro-optic effect), or other static and/or tunable optical components. Components 16 may be used in proving light to display(s) 18 to illuminate display(s) 18 and in may be used in providing images from display(s) 18 to a user for viewing. In some configurations, one or more of components 16 may be stacked, so that light passes through multiple components in series. In other configurations, components may be spread out laterally (e.g., multiple displays may be arranged on a waveguide or set of waveguides using a tiled set of laterally adjacent couplers). Configurations may also be used in which both tiling and stacking are present.

Input-output circuitry 14 may include components such as input-output devices 22 for gathering data and user input and for supplying a user with output. Devices 22 may include sensors 26, audio components 24, and other components for gathering input from a user or the environment surrounding device 10 and for providing output to a user. Devices 22 may, for example, include keyboards, buttons, joysticks, touch sensors for trackpads and other touch sensitive input devices, cameras, light-emitting diodes, and/or other input-output components.

Cameras or other devices in input-output circuitry 14 may face a user's eyes and may track a user's gaze. Sensors 26 may include position and motion sensors (e.g., compasses, gyroscopes, accelerometers, and/or other devices for monitoring the location, orientation, and movement of head-mounted display 10, satellite navigation system circuitry such as Global Positioning System circuitry for monitoring user location, etc.). Using sensors 26, for example, control circuitry 12 can monitor the current direction in which a user's head is oriented relative to the surrounding environment. Movements of the user's head (e.g., motion to the left and/or right to track on-screen objects and/or to view additional real-world objects) may also be monitored using sensors 26.

If desired, sensors 26 may include ambient light sensors that measure ambient light intensity and/or ambient light color, force sensors, temperature sensors, touch sensors, capacitive proximity sensors, light-based proximity sensors, other proximity sensors, strain gauges, gas sensors, pressure sensors, moisture sensors, magnetic sensors, etc. Audio components 24 may include microphones for gathering voice commands and other audio input and speakers for providing audio output (e.g., ear buds, bone conduction speakers, or other speakers for providing sound to the left and right ears of a user). If desired, input-output devices 22 may include haptic output devices (e.g., vibrating components), light-emitting diodes and other light sources, and other output components. Circuitry 14 may include wired and wireless communications circuitry 20 that allows head-mounted display 10 (e.g., control circuitry 12) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
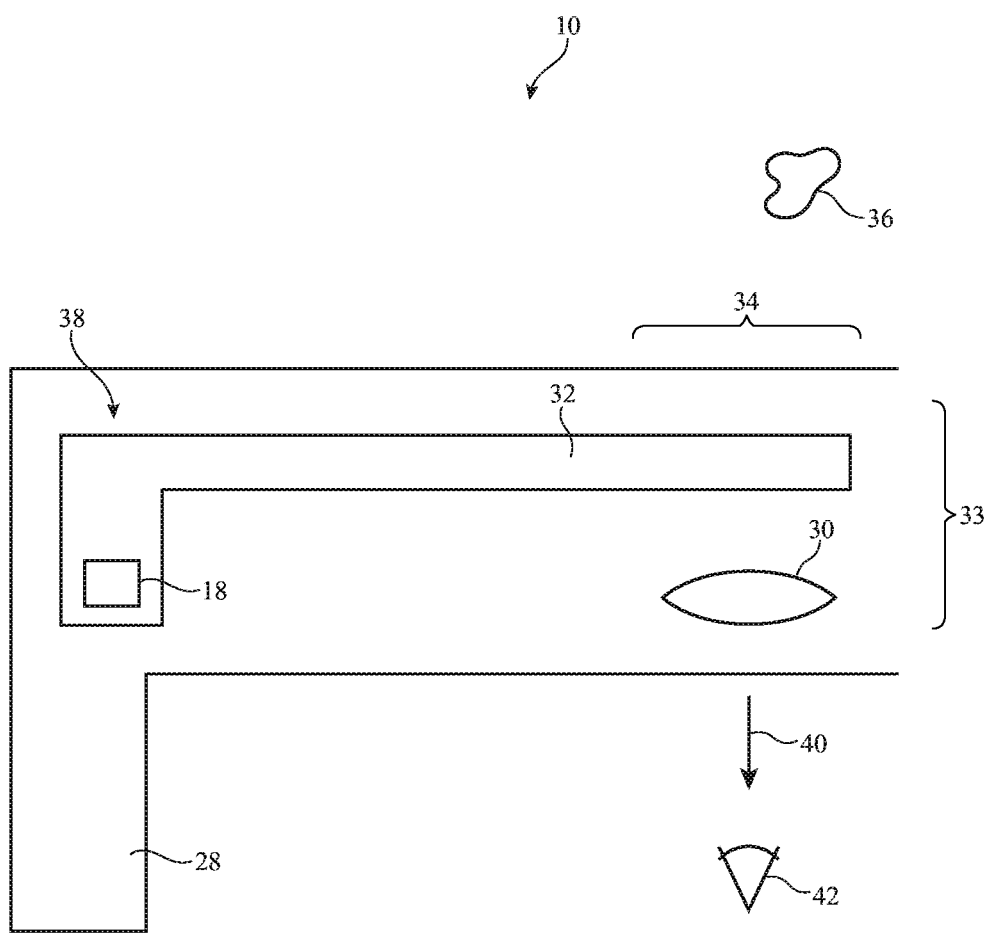
FIG. 2 is a diagram of an illustrative head-mounted device for a single eye in accordance with an embodiment.

The components of head-mounted display 10 may be supported by a head-mountable support structure such as illustrative support structure 28 of FIG. 2. Support structure 28, which may sometimes be referred to as a housing, may be configured to form a frame of a pair of glasses (e.g., left and right temples and other frame members), may be configured to form a helmet, may be configured to form a pair of goggles, or may have other head-mountable configurations.

Optical system 33 may be supported within support structure 28 and may be used to provide images from display(s) 18 to a user (see, e.g., the eyes of user 42 of FIG. 2). With one illustrative configuration, display(s) 18 may be located in outer (edge) portions 38 of optical system 33 and may have one or more pixel arrays that produce images. Light associated with the images may be coupled into waveguides in outer portions 38 using input coupler systems. The light within the waveguide may traverse intermediate regions 32. In central portion(s) 34 of system 33 (at the opposing ends of the waveguides from the input coupler systems and display(s) 18), output coupler systems formed from one or more output couplers may couple the light out of the waveguide. This light may pass through optional lenses 30 in direction 40 for viewing by user 42. Portion(s) 34 of optical system 33 may be transparent, so that user 42 may view external objects such as object 36 through this region of system 33 while system 33 overlays computer-generated content (image content generated by control circuitry 12 of FIG. 1) with objects such as object 36.

Figure 3:
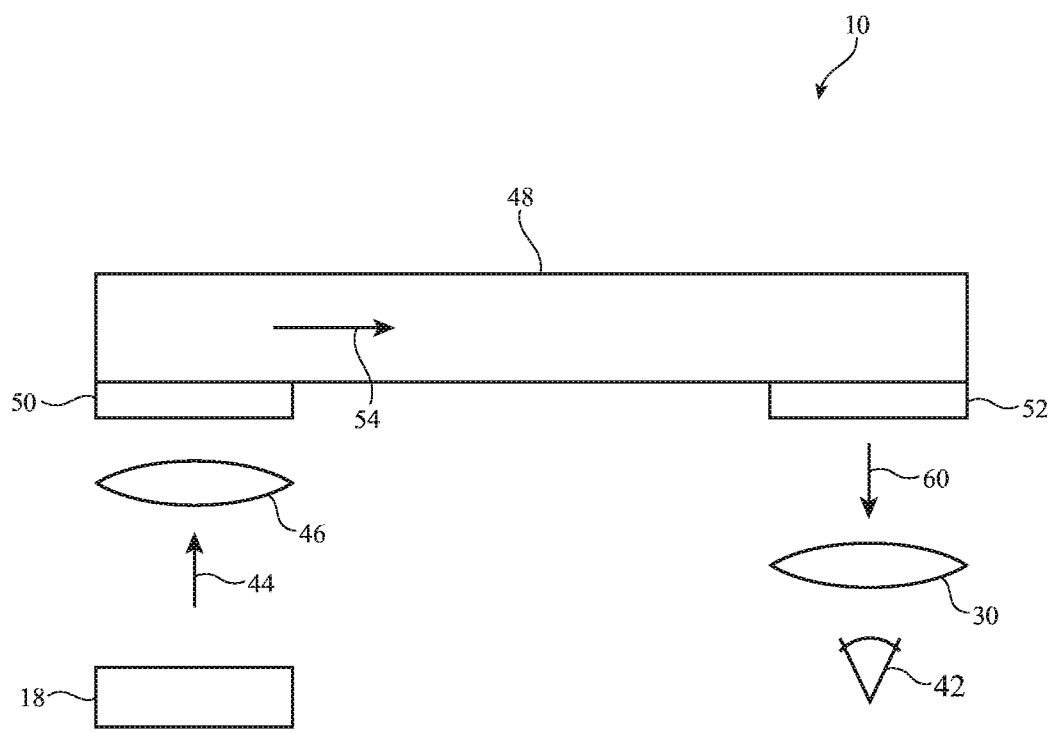
FIG. 3 is a top view of an illustrative optical system and associated display system for a head-mounted device in accordance with an embodiment.

FIG. 3 is a diagram of illustrative components that may be used in forming device 10. The diagram of FIG. 3 includes components for one of the user's eyes. Device 10 may contain two sets of such components to present images to both of a user's eyes.

As shown in FIG. 3, device 10 may include a display such as display(s) 18 for producing image light 44. Image light 44 may be generated by illuminating a reflective display containing an array of pixels, using a scanning device, or using any other desired display components. The images presented on the array of pixels may be conveyed through lens 46 to input coupler 50, which couples image light 44 into waveguide 48 (e.g., a planar waveguide). The image light coupled into waveguide 48 is confined within waveguide 48 in accordance with the principle of total internal reflection and travels towards output coupler 52 as indicated by light 54.

Output coupler 52 couples light 54 (image light) out of waveguide 48 and towards viewer 42 (an eye of a user), as output light (output image light) 60. Optional lens 30 may help focus image light for viewer 42. Input coupler 50 and output coupler 52 may be, for example, structures such as Bragg gratings that couple light into waveguides and that couple light out of the waveguides. Couplers 50 and 52 may be formed from volume holograms or other holographic coupling elements (e.g., thin or thick layers of photopolymers and/or other optical coupler structures in which holographic patterns are recorded using lasers), prisms, angled transparent structures, lenses, or any other desired light coupling elements. Couplers 50 and 52 may have infinite focal lengths (e.g., couplers 50 and 52 may be plane-to-plane couplers) or may have associated finite focal lengths. For example, optical coupler 52 can be powered (e.g., coupler 52 can be configured to form a lens of a desired finite focal length) in which case lens 30 may be omitted or the focal length of lens 30 may be adjusted.

Figure 4:
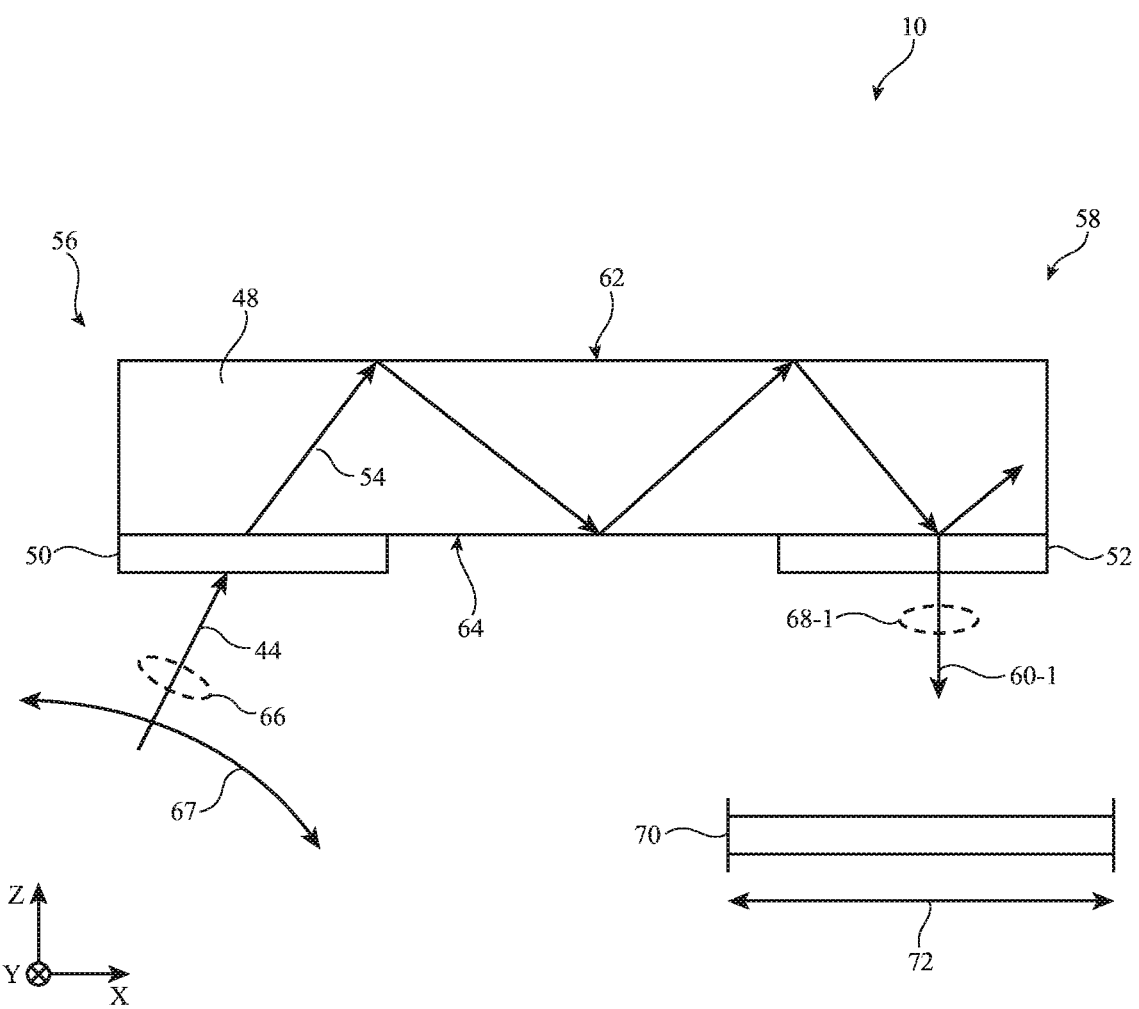
FIG. 4 is a top view of an illustrative optical system having a waveguide without beam splitter structures in accordance with an embodiment.

FIG. 4 is a diagram showing how light 54 may propagate through waveguide 48 to output coupler 52. Lenses 46 and 30 and display(s) 18 of FIG. 3 are not shown in FIG. 4 for the sake of clarity. As shown in FIG. 4, image light 44 may be coupled into waveguide 48 using input coupler 50. Corresponding light 54 may reflect between surfaces 62 and 64 of waveguide 48 under the principle of total internal reflection (e.g., as light 54 propagates from end 56 to opposing end 58 of waveguide 48). Output light 60 may be coupled out of waveguide 48 at one or more locations overlapping output coupler 52 (e.g., at locations overlapping output coupler 52 where light 54 hits surface 64 of waveguide 48).

In the example of FIG. 4, output coupler 52 outputs light 60-1 towards eye box 70. Eye box 70 may be a location at which user 42 (FIG. 3) places their eye for viewing light from display 18. Eye box 70 has a finite area (width) 72. In practice, the light that propagates through waveguide 48 has a finite, non-zero beam width. For example, image light 44 may have a corresponding beam area (width) 44. Similarly, output light 60-1 has a beam area (width) 68-1. Beam area 68-1 extends over two-dimensions, may sometimes be referred to herein as pupil 68-1, and may correspond to a peak of light intensity that is greater than a threshold intensity.

The example of FIG. 4 is merely illustrative. In general, any desired input and output coupler structures may be used. Couplers 50 and 52 may be formed on surface 62 and/or surface 64 of waveguide 48. If desired, couplers 50 and/or 52 may be embedded within waveguide 48.

If care is not taken, beam width 68-1 may be too small to fill all of eye box 70 with light of uniform intensity (brightness). This may lead to images being displayed with non-uniform brightness across eye box 70. As the user moves or rotates their eye within eye box 70, the image will thus appear undesirably dark for some portions of the image. It may therefore be desirable to be able to provide waveguide 48 with structures that allow waveguide 48 to fill eye box 72 with light (e.g., so that a uniform intensity of light is provided across area 72 of eye box 70 for as large an eye box as possible). It may also be desirable to be able to provide eye box 70 with uniform light intensity for a wide field of view 67 of incoming light 44.

Figure 5:
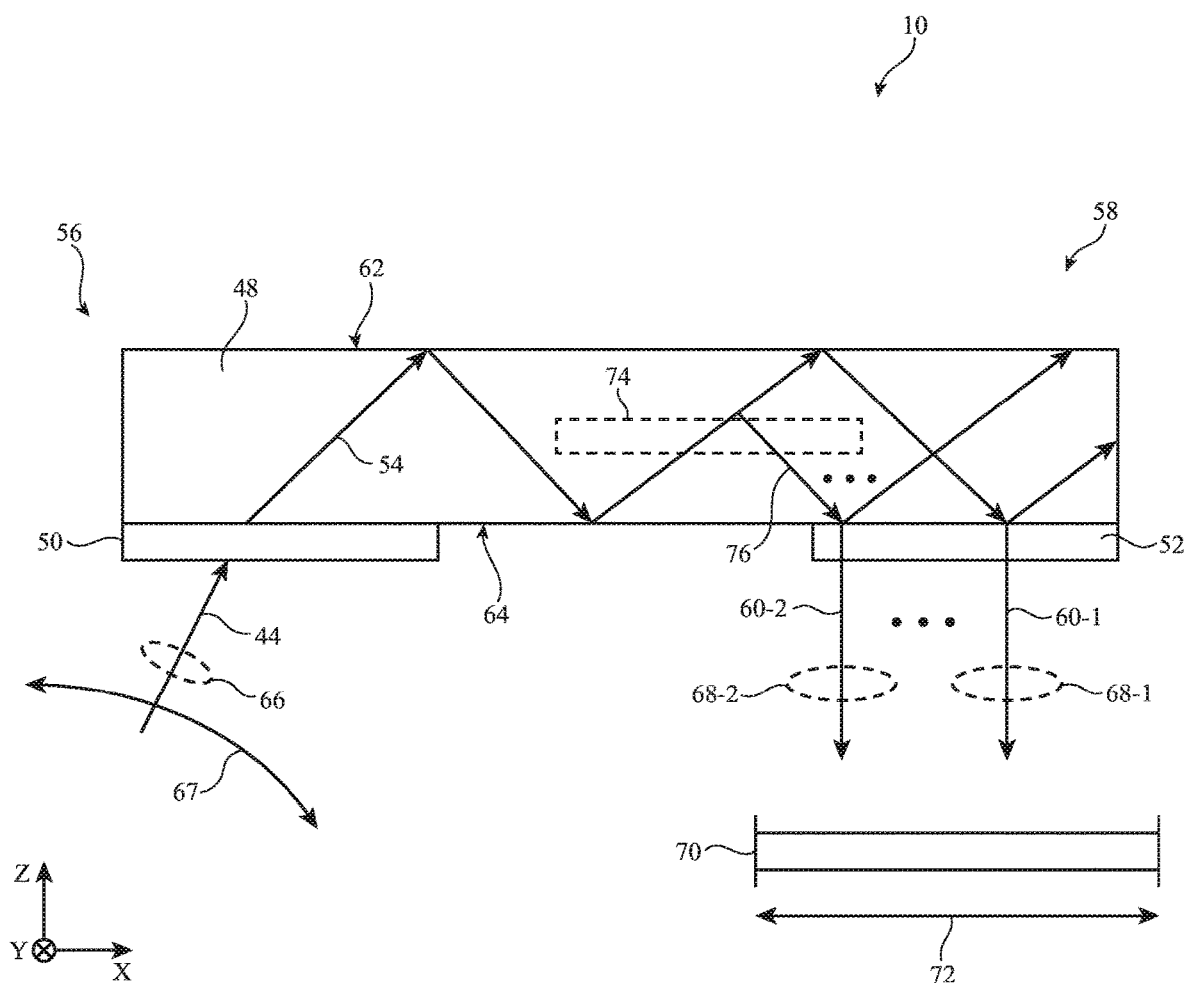
FIG. 5 is a top view of an illustrative optical system having beam splitter structures embedded within a waveguide for filling an eye box with light in accordance with an embodiment.

FIG. 5 is a diagram showing how waveguide 48 may be provided with structures that allow waveguide 48 to fill a relatively large eye box 70 with uniform light intensity over a wide field of view 67. Lenses 46 and 30 and display(s) 18 of FIG. 3 are not shown in FIG. 5 for the sake of clarity.

As shown in FIG. 5, beam splitter structures such as beam splitter structures 74 may be embedded within waveguide 48. Beam splitter structures may be configured to pass (transmit) a first portion of light 54 within waveguide 48 while also reflecting a second portion of light 54. As shown in FIG. 5, light 54 may propagate down the length of waveguide 48 and may pass through beam splitter structures 74. A portion of this light may be reflected by beam splitter structures 74, as shown by reflected light 76. Output coupler 52 may couple reflected light 76 out of waveguide 48 as a beam of output light 60-2. Output light 60-2 may have beam area (width) 68-2. Together with output light 60-1, output light 60-2 may help to fill eye box 70 with light of uniform intensity across area 72 of eye box 70. For example, area 68-2 of output light 60-2 and area 68-1 of output light 60-1 may cumulatively extend across area 72. In this way, waveguide 48 may be configured to expand the area within eye box 70 that is filled with image light relative to scenarios where beam splitter structures 74 are omitted.

Beam splitter structures 74 may be provided with a selected reflectivity (reflection coefficient R) so that a desired percentage of image light 54 is reflected each time light 54 passes through beam splitter structures 74. Beam splitter structures 74 may reflect light 54 any desired number of times. Beam splitter structures 74 may, for example, have a length such that multiple reflections of light 54 off of surface 64 of waveguide 48 are reflected towards output coupler 52 as reflected light 76. A portion of reflected light 76 may also reflect off of surface 64 back towards beam splitter structures 74 and this portion may also be transmitted to surface 62 and/or reflected towards output coupler 52. Each light reflection off of beam splitter structures 74 and surface 62 that hits output coupler 52 may produce a corresponding beam of output light 60 having a corresponding beam width 68. Collectively, each of these reflections and beams of output light may help to fill area 72 of eye box 70 with light of uniform intensity. In this way, eye box 70 may be filled with light from a wide field of view 67 and the user may move or rotate their eye within eye box 70 without any undesirable loss in image brightness.

The example of FIG. 5 is merely illustrative. Beam splitter structures 74 may be embedded within waveguide 48, may be formed as additional layers on surface 62 of waveguide 48 (e.g., external to waveguide 48 so long as total internal reflection is maintained), and/or may be formed as additional layers on surface 64 of waveguide 48 (e.g., external to waveguide 48 so long as total internal reflection is maintained). Any number of reflections from beam splitter structures 74 and surface 62 of waveguide 48 may be coupled out of waveguide 48 as output light 60.

Figure 6:
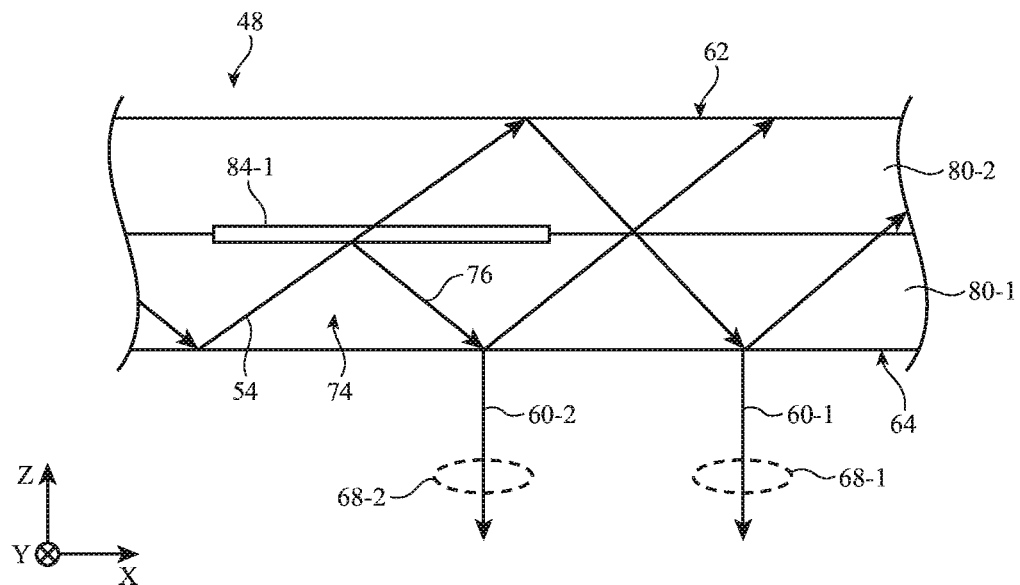
FIG. 6 is a top view of illustrative beam splitter structures having a single beam splitter layer embedded within a waveguide in accordance with an embodiment.

Beam splitter structures 74 may include any desired beam splitter structures. FIGS. 6-13 show examples of different illustrative beam splitter structures for waveguide 48. In the examples of FIGS. 6-13, output coupler 52 of FIG. 5 has been omitted for the sake of clarity. If desired, beam splitter structures 74 may be formed from one or more beam splitter layers embedded within waveguide 48. FIG. 6 is a diagram showing how beam splitter structures 74 may include a single beam splitter layer embedded within waveguide 48.

As shown in FIG. 6, beam splitter structures 74 may include a single beam splitter layer such as beam splitter layer 84-1. Beam splitter layer 84-1 may extend across the entire length of waveguide 48 (e.g., from end 56 to end 58 of FIG. 5) or may be laterally localized within a particular region of waveguide 48.

Waveguide 48 may include one or more stacked transparent layers 80. Transparent layers 80 may be formed from glass, transparent plastic, sapphire, or any other desired transparent substrate structures. As an example, waveguide 48 may include a first transparent layer 80-1 and a second transparent layer 80-2. Beam splitter layer 84-1 may be embedded between transparent layers 80-1 and 80-2 (e.g., beam splitter layer 84-1 may be formed on a top surface of layer 80-1 and layer 80-2 may be laminated, adhered, or attached to layer 80-1 over beam splitter layer 84-1).

Beam splitter layer 84-1 may reflect a first portion of light 54 towards surface 64, as shown by reflected light 76. Beam splitter layer 74 may transmit a second portion of light 54 towards surface 62 of waveguide 48. The second portion of light 54 may reflect off of surface 62 towards surface 64 and may be coupled out of waveguide 48 as output light 60-1 (e.g., a beam of light having beam area 68-1). Reflected light 76 may be coupled out of waveguide 48 as output light 60-2 (e.g., a beam of light having beam area 68-1). If desired, reflected light 76 may reflect off of surface 64 back towards beam splitter layer 84-1 and beam splitter layer 84-1 may reflect this light back towards surface 64 for generating additional beam(s) of output light. Beam splitter layer 84-1 may have any suitable length for reflecting light out of waveguide 48 any desired number of times.

Beam splitter layer 84-1 may have a selected reflectivity (e.g., reflection coefficient R and corresponding transmission coefficient T equal to 1−R) such that any desired amount of light 54 is reflected towards surface 64. Beam splitter layer 84-1 may be formed from a dielectric coating, a metallic coating, a thin/surface hologram or diffraction grating, or any other desired structures that reflect and transmit incident light. The properties of beam splitter layer 84-1 may be selected to provide beam splitter layer 84-1 with any desired reflection and transmission coefficients. If desired, beam splitter structures 74 may include additional stacked and/or laterally offset beam splitter layers to increase the number of beams of output light 60 (e.g., to more uniformly fill eye box 70 of FIG. 4 relative to scenarios where only a single beam splitter layer is used).

Figure 7:
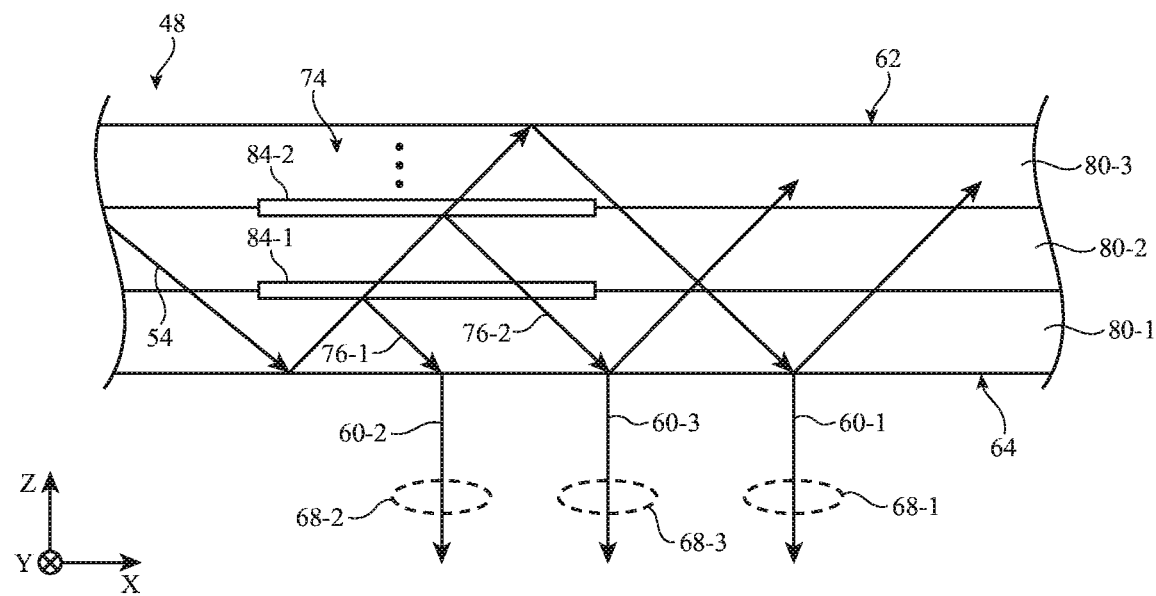
FIG. 7 is a top view of illustrative beam splitter structures having multiple stacked beam splitter layers embedded within a waveguide in accordance with an embodiment.

FIG. 7 is a diagram showing how beam splitter structures 74 may include multiple stacked beam splitter layers such as an additional beam splitter layers 84-2 stacked over beam splitter layer 84-1. As shown in FIG. 7, waveguide 48 may include a third transparent layer 80-3 over transparent layer 80-2. Beam splitter layer 84-2 may completely or at least partially overlap beam splitter layer 84-1.

A first portion of light 54 may be reflected off of beam splitter layer 84-1 as reflected light 76-1. A second portion of light 54 may be transmitted through beam splitter layer 84-1. A first portion of this light may be reflected off of beam splitter layer 84-2 as reflected light 76-2. A second portion of this light may be transmitted through beam splitter layer 84-2, reflected off of surface 62, and coupled out of waveguide 48 as output light 60-1. Reflected light 76-1 may be coupled out of waveguide 48 as output light 60-2. Reflected light 76-2 may be coupled out of waveguide 68 as output light 60-3 (e.g., a beam of light having beam area 68-3).

Beam splitter layer 84-2 may have a selected reflectivity (e.g., reflection coefficient R and corresponding transmission coefficient T) such that any desired amount of light 54 is reflected towards surface 64 and transmitted to surface 62. Beam splitter layer 84-2 may be formed from a dielectric coating, a metallic coating, a thin/surface hologram or diffraction grating, or any other desired structures that reflect and transmit incident light. In this way, multiple beams of output light 60 may be provided to more uniformly fill eye box 70 of FIG. 4 with image light. Using stacked beam splitter layers in this way may increase the number of reflections and corresponding output beams relative to scenarios where only a single beam splitter layer is used, for example.

The example of FIG. 7 is merely illustrative. In general, waveguide 48 may include any desired number of beam splitter layers 84 and transparent layers 80. Each beam splitter layer 84 may completely or partially overlap the other beam splitter layers in beam splitter structures 74. Beam splitter structures 74 may include multiple laterally offset beam splitter layers if desired.

Figure 8:
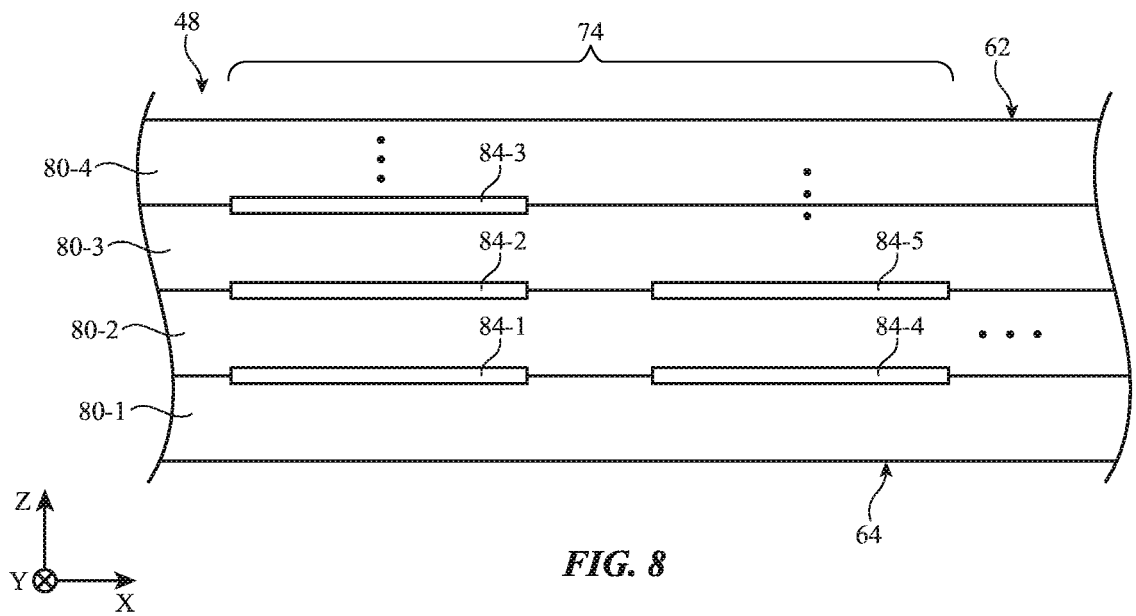
FIG. 8 is a top view of illustrative beam splitter structures having multiple stacked and laterally-offset beam splitter layers embedded within a waveguide in accordance with an embodiment.

FIG. 8 is a diagram showing how beam splitter structures 74 may include multiple stacked and laterally-displaced beam splitter layers. As shown in FIG. 8, waveguide 48 may include a fourth transparent layer 80-4 over transparent layer 80-3. Beam splitter structures 74 may include three or more stacked beam splitter layers such as beam-splitter layers 84-1, 84-2, and 84-3. Some of the beam splitter layers such as beam splitter layer 84-4 may be laterally displaced (offset) with respect to other beam splitter layers such as beam splitter layer 84-1.

As shown in FIG. 8, beam splitter layer 84-4 may be laterally separated from beam splitter layer 84-1 on substrate 80-1. Beam splitter layers 84-1 and 84-4 may be replaced by one continuous beam splitter layer in another suitable arrangement. One or more beam splitter layers such as beam splitter layer 84-5 may be stacked over beam splitter layer 84-4 (e.g., beam splitter structures 74 may include any desired number of stacked or individual beam splitter layers formed at one or more different locations along the one or more lateral planes within waveguide 48).

The example of FIG. 8 is merely illustrative of different beam splitter layers 84 that may be included in beam splitter structures 74. One or more of beam splitter layers 84-3, 84-2, 84-1, 84-5, and 84-4 may be omitted. Multiple transparent layers 80 may be interposed between adjacent stacked beam splitter layers if desired (e.g., multiple transparent layers 80 may be interposed between beam splitter layers 84-1 and 84-2). In the example of FIGS. 7 and 8, each beam splitter layer completely overlaps another beam splitter layer in beam splitter structures 74. If desired, the beam splitter layers may only partially overlap other beam splitter layers in structures 74.

Figure 9:
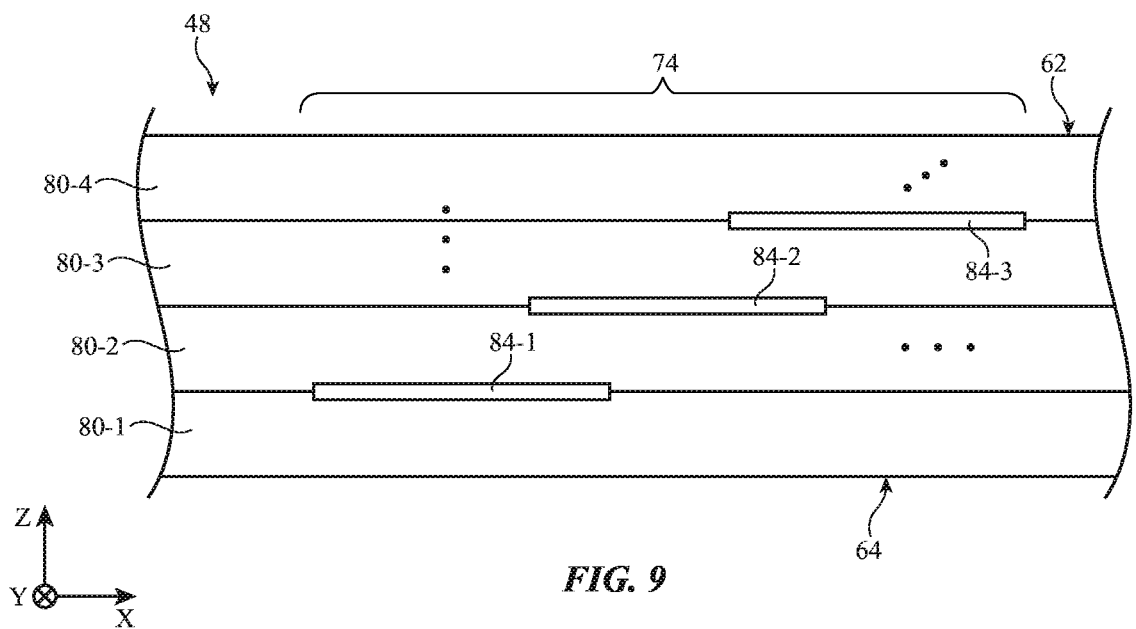
FIG. 9 is a top view of illustrative beam splitter structures having multiple partially-overlapping beam splitter layers embedded within a waveguide in accordance with an embodiment.

FIG. 9 is a diagram showing how beam splitter structures 74 may include partially overlapping beam splitter layers. As shown in FIG. 9, beam splitter layer 84-1 partially overlaps beam splitter layer 84-2 which partially overlaps beam splitter layer 84-3. This example is merely illustrative. Beam splitter layers 84-1, 84-2, and/or 84-3 of FIG. 9 may be omitted if desired. One, two, ore more than two layers 80 may be interposed between beam splitter layers 84-1 and 84-2, between beam splitter layers 84-2 and 84-3, etc. Additional beam splitter layers may be stacked with and completely or partially overlap one or more of these beam splitter layers (e.g., using combinations of the arrangements of FIGS. 6-9). Beam splitter structures 74 may include any desired number of beam splitter arrangements that are at least partially overlapping or non-overlapping. In general, by placing one or more beam splitter layers at one or more desired locations across the lateral surface area of one or more transparent layers 80 in waveguide 48, a suitable number of output beams 60 may be produced at surface 64 of waveguide 48 to uniformly fill eye box 70 with image light (e.g., the beam widths 68 of each output beam may collectively extend across area 72 of eye box 70).

The example of FIGS. 6-9 in which beam splitter structures 74 include one or more thin beam splitter layers (e.g., dielectric or metal coatings) is merely illustrative. If desired, beam splitter structures 74 may be formed from layers 80 of waveguide 48 having different indices of refraction (e.g., without dielectric or metal coatings). One or more of beam splitter layers 84 of FIGS. 6-9 may be embedded within a single dielectric layer 80 in waveguide 48 if desired. In this scenario, at least some dielectric material from that single dielectric layer may be interposed between stacked beam splitter layers 84 (e.g., at least some dielectric material from the single dielectric layer may be interposed between beam splitter layers 84-1 and 84-2 of FIG. 7). Beam splitter layers 84 may include dielectric coatings or hologram reflectors that are configured to partially reflect only light incident at large angles or at specific wavelengths while preserving transmittance for light incident from outside (e.g., to allow for the satisfactory overlay of external world light with image light generated by the display), if desired. In examples where beam splitter layers 84 include metallic coatings, low loss metals can be used (e.g., silver, aluminum, metal layers having reduced area) to reduce optical absorption (e.g., to help hide the metallic coatings from being perceivable to a user).

Figure 10:
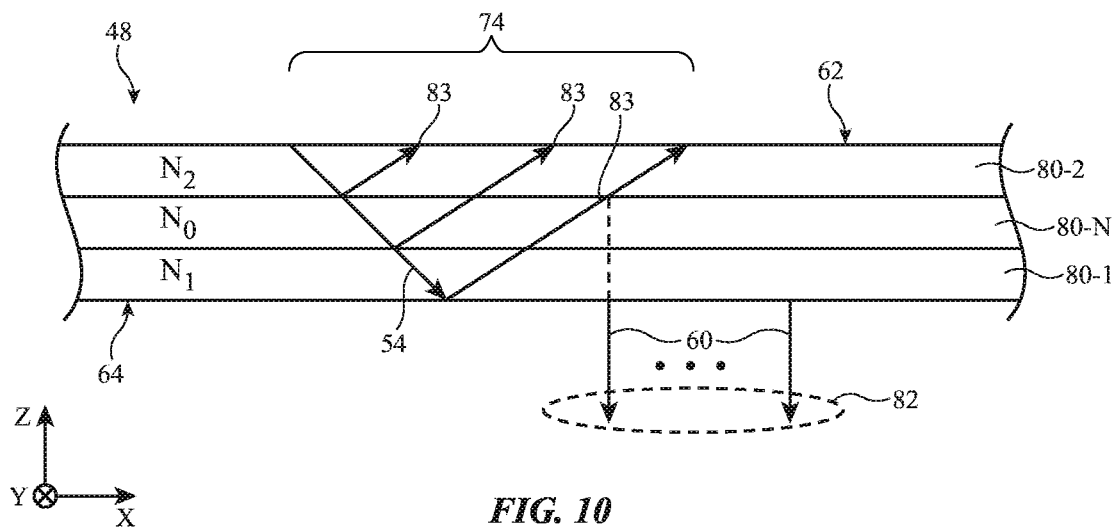
FIG. 10 is a top view of illustrative beam splitter structures having multiple layers with different indices of refraction in accordance with an embodiment.

FIG. 10 is a diagram showing how beam splitter structures 74 may be formed from different layers 80 of waveguide 48 having different indices of refraction. As shown in FIG. 10, waveguide 48 may have a transparent layer 80N interposed (sandwiched) between transparent layers 80-1 and 80-2. Transparent layer 80N may have a different index of refraction from the index of refraction of layers 80-1 and 80-2.

In the example of FIG. 10, layer 80N has an index of refraction $N_0$, layer 80-1 has an index of refraction $N_1$, and layer 80-2 has an index of refraction $N_2$. As long as these indices of refraction are not equal, light 54 will reflect at the interface between layers 80-2 and 80N and at the interface between layers 80N and 80-1. The first of these reflections is shown in FIG. 10 by arrows 83. Each reflection 83 may be reflected towards surface 64 of waveguide 48 (e.g., by the interface between layers 80-1 and 80-N, the interface between layers 80N and 80-2, and/or surface 62) to produce at least one output beam 60. Collectively, output beams 60 may exhibit a collective beam area 82 that fills eye box 70 (e.g., beam area 82 may fill area 72 of eye box 70). While light 54 is shown as propagating in a straight line in FIG. 10 for the sake of clarity, the light passing through layer 80N is refracted at an angle based on the indices of refraction of waveguide 48.

Layer 80N may be formed from any desired transparent material having index of refraction $N_0$ (e.g., a non-hologram material). The example of FIG. 10 is merely illustrative and, if desired, multiple layers such as layer 80N may be stacked within waveguide 48 and sandwiched between different-index layers 80 (e.g., an additional layer 80N or other layer having a different index of refraction may be stacked over layer 80-2 and/or under layer 80-1, etc.). If desired, layer 80N may be formed from thick volume hologram having a bulk index of refraction equal to No. In scenarios where beam splitter structures 74 include a thick volume hologram interposed between layers 80-1 and 80-2, the thick volume hologram may reflect light at multiple locations across its thickness.

Figure 11:
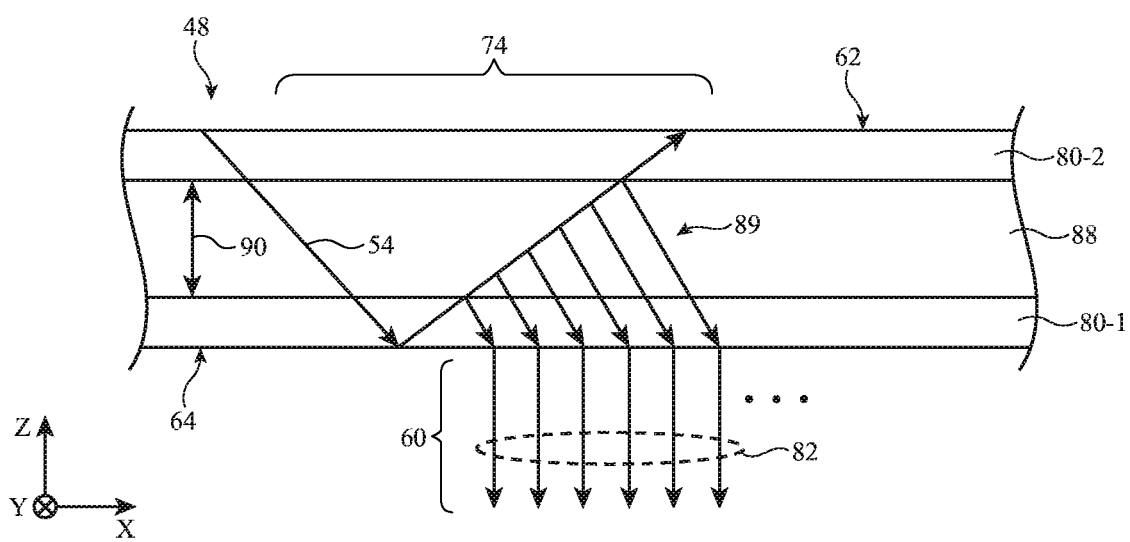
FIG. 11 is a top view of illustrative beam splitter structures having a thick volume hologram embedded within a waveguide in accordance with an embodiment.

FIG. 11 is a diagram showing how beam splitter structures 74 may be formed from a thick volume hologram interposed between layers 80-1 and 80-2. As shown in FIG. 11, a thick volume hologram layer 88 may be interposed between 80-1 and 80-2. Thick volume hologram layer 88 may have thickness 90 that is greater than the thickness of beam splitter layers 84 of FIGS. 6-9. If desired, thickness 90 may be greater than the thicknesses of layers 80-1 or 80-2.

A portion of light 54 may reflect (leak) towards surface 64 of waveguide 48 at multiple points along the path of light 54 through layer 88 (e.g., along thickness 90), as shown by arrows 89. Each reflected portion 89 of light 54 may generate a corresponding output beam 60, where the output beams 60 have a collective beam area 82 (e.g., such that a continuous beam of light is coupled out of waveguide 48 having beam area 82). Beam area 82 may fill eye box 70 with image light of uniform intensity.

Beam splitter structures 74 (e.g., beam splitter layers 84 of FIGS. 6-9, layer 80N of FIG. 10, and/or layer 88 of FIG. 11) may have uniform (constant) reflection and transmission coefficients across their lengths (e.g., parallel to the X-axis of FIGS. 6-11). If desired, beam splitter structures 74 (e.g., beam splitter layers 84 of FIGS. 6-9, layer 80N of FIG. 10, and/or layer 88 of FIG. 11) may exhibit non-uniform (varying) reflection and transmission coefficients across their lengths. This variation in reflection and transmission coefficient may be discrete or continuous.

Figure 12:
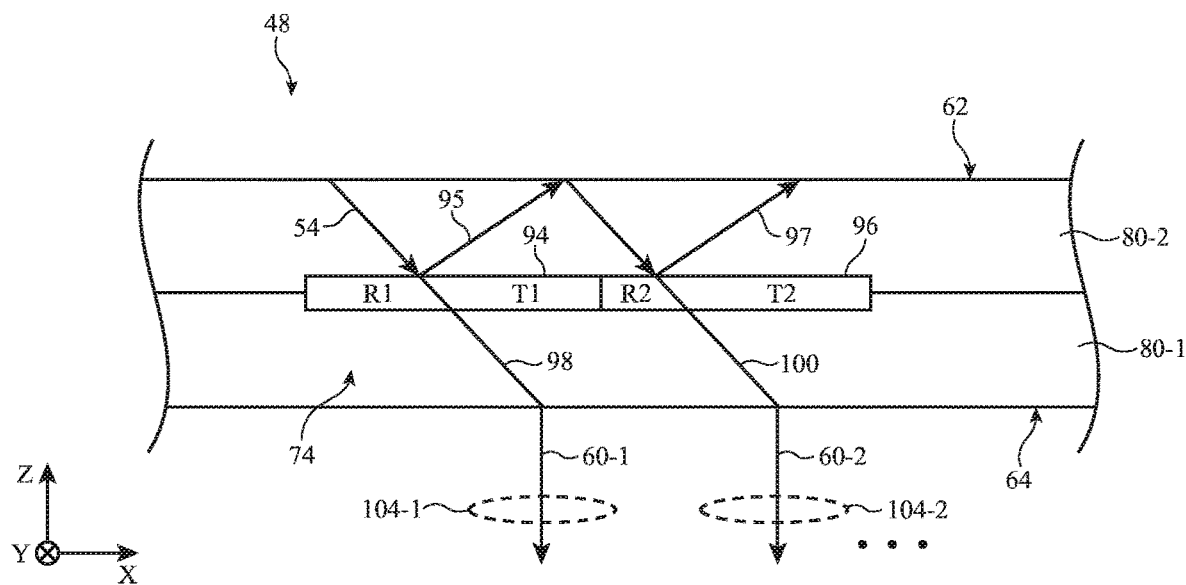
FIG. 12 is a top view of illustrative beam splitter structures having a single beam splitter layer with regions having different reflection and transmission coefficients in accordance with an embodiment.

FIG. 12 is a diagram showing how the transmission and reflection coefficients of beam splitter structures 74 may vary discretely across their lengths. As shown in FIG. 12, beam splitter structures 74 may include a first portion (region) 94 having a first reflection coefficient R1 and a first transmission coefficient T1 and a second portion (region) 96 having a second reflection coefficient R2 and a second transmission coefficient T2. In the example of FIG. 12, regions 94 and 96 are shown as being regions of a single beam splitter layer (e.g., beam splitter layer 84-1 of FIG. 6) between substrate layers 80-2 and 80-1. This is merely illustrative and, if desired, regions 94 and 96 may include multiple beam splitter layers 84 (e.g., as shown in FIGS. 8 and 9), a substrate layer in waveguide 48 (e.g., layer 80N of FIG. 10), and/or a thick volume hologram (e.g., layer 88 of FIG. 11).

Transmission coefficient T2 may be different than transmission coefficient T1 and reflection coefficient R2 may be different than reflection coefficient RE For example, transmission coefficient T2 may be greater than transmission coefficient T1 and reflection coefficient R2 may be less than reflection coefficient R1 (e.g., R1 may be 90% whereas R2 is 10%, R1 may be between 85% and 95% whereas R2 is between 5% and 15%, R1 may be between 50% and 99% whereas R2 is between 50% and 1%, etc.).

As shown in FIG. 12, a first portion 95 of image light 54 may be reflected off of region 94 (e.g., proportional to reflection coefficient R1) and a second portion 98 of image light 54 may be transmitted by region 94 (e.g., proportional to transmission coefficient T1). A first portion 97 of light 95 may be reflected off of region 96 (e.g., proportional to reflection coefficient R2) and a second portion 100 of light 95 may be transmitted by region 96 (e.g., proportional to transmission coefficient T2). Light 98 may be coupled out of waveguide 48 as output light 60-1 (e.g., having beam area 104-1) and light 100 may be coupled out of waveguide 48 as output light 60-2 (e.g., having beam area 104-2). Additional reflections off of regions 94 and 96 or other regions in beam splitter structures 74 may produce additional beams of output light. Beam areas 104 may collectively fill area 72 of eye box 70.

In scenarios where the transmission coefficient is too high at the location where light 54 first hits beam splitter structures 74, there may be excessive output light (beam) density at the left side of beam splitter structures 74 and insufficient output light density at the right side of beam splitter structures 74. This can reduce the uniformity of the light intensity across eye box 70. By varying the transmission and reflection coefficients in this way, beam splitter structures 74 may provide more uniform beam replication across their lengths.

Regions 94 and 96 may be provided with different reflection and transmission coefficients by adjusting the dielectric or metal coating used to form beam splitter structures 84 of FIGS. 6-9 (e.g., so that the coating reflects or passes more or less light), adjusting the indices of refraction of FIG. 10, and/or by providing different thick volume hologram structures of FIG. 11 in each of the regions. The example of FIG. 12 is merely illustrative. If desired, beam splitter structures 74 may include any desired number of discrete regions having different reflection and transmission coefficients such as regions 94 and 96 (e.g., three regions, four regions, more than four regions, etc.). The regions may have decreasing reflection coefficients as light 54 propagates down waveguide 48, for example.

Figure 13:
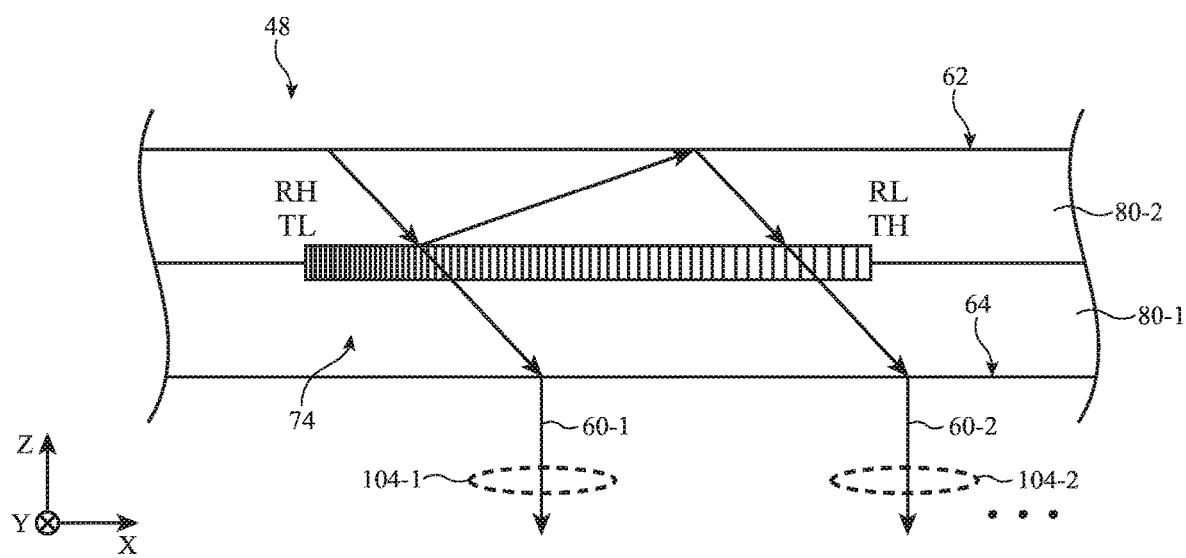
FIG. 13 is a top view of illustrative beam splitter structures having a single beam splitter layer with continuously varying transmission and reflection coefficients along their length in accordance with an embodiment.

If desired, beam splitter structures 74 may have continuously varying reflection and transmission coefficients. FIG. 13 is a diagram showing how the transmission and reflection coefficients of beam splitter structures 74 may vary continuously across their lengths. As shown in FIG. 13, beam splitter structures 74 may have a relatively high reflection coefficient RH (e.g., 90%, between 85% and 95%, between 50% and 99%, etc.) and a relatively low transmission coefficient T1 at the left end. Beam splitter structures 74 may have a relatively low reflection coefficient RL and a relatively high transmission coefficient TH (e.g., 90%, between 85% and 95%, between 50% and 99%, etc.) at the right end. The transmission and reflection coefficients of beam splitter structures 74 may vary continuously from RH and TL to RL and TH along the X-axis of FIG. 13. This may help to provide uniform beam replication density across the length of beam splitter structures 74, for example.

In the example of FIG. 13, beam splitter structures 74 are shown as including a single beam splitter layer (e.g., beam splitter layer 84-1 of FIG. 6) between substrate layers 80-2 and 80-1. This is merely illustrative and, if desired, beam splitter structures 74 of FIG. 13 may include multiple beam splitter layers 84 (e.g., as shown in FIGS. 6-9), a substrate layer in waveguide 48 (e.g., layer 80N of FIG. 10), and/or a thick volume hologram (e.g., layer 88 of FIG. 11). In another suitable arrangement, holograms with varying efficiency across the lateral area of the beam splitter structures may be used to produce beam splitter structures with varying reflectivity. Different reflection coefficients may be established by using different masking operations to deposit more dielectric or metallic coating material at different locations across the lateral area of the beam splitter structures, by using different holograms at different locations across the lateral area of the beam splitter structures, by using more stacked holograms at some locations across the lateral area of the beam splitter structures than others, by varying the relative indices of refraction between the layers of waveguide 48 across the lateral area of the beam splitter structures, etc.

In general, any desired combination of the arrangements of FIGS. 6-13 may be used to form beam splitter structures 74 (e.g., using one or more beam splitter layers 84, one or more sandwiched substrate layers 80N, and/or one or more thick volume holograms 88 having constant reflection coefficients or discretely/continuously varying reflection coefficients). Each of these structures may be stacked, partially overlapping, completely overlapping, or non-overlapping with one or more (e.g., all) of the other structures in beam splitter structures 74.

In the example of FIGS. 6-13, beam splitter structures 74 are illustrated as expanding the light used to fill eye box 70 along a single dimension (e.g., parallel to the X-axis). This is merely illustrative. In general, if desired, beam splitter structures 74 may expand the light in two dimensions (e.g., parallel to the X-axis and the Y-axis).

Figure 14:
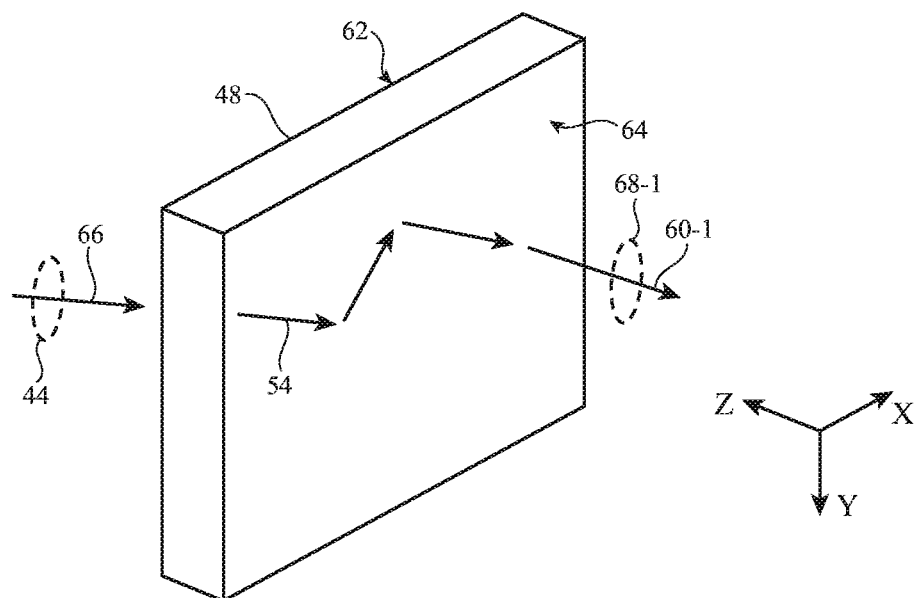
FIG. 14 is a perspective view of a waveguide of the type shown in FIG. 4 in accordance with an embodiment.

FIG. 14 is a perspective view of a waveguide 48 in the absence of beam splitter structures 74. As shown in FIG. 14, image light 66 having beam area 44 is coupled into waveguide 48 and corresponding light 54 propagates down the length of waveguide 48. The light is coupled out of waveguide 48 as output light 60-1 having beam area 68-1. Output light 60-1 is provided to eye box 70 (FIG. 4). Beam area 68-1 may be insufficient to cover all of area 72 of eye box 70.

Figure 15:
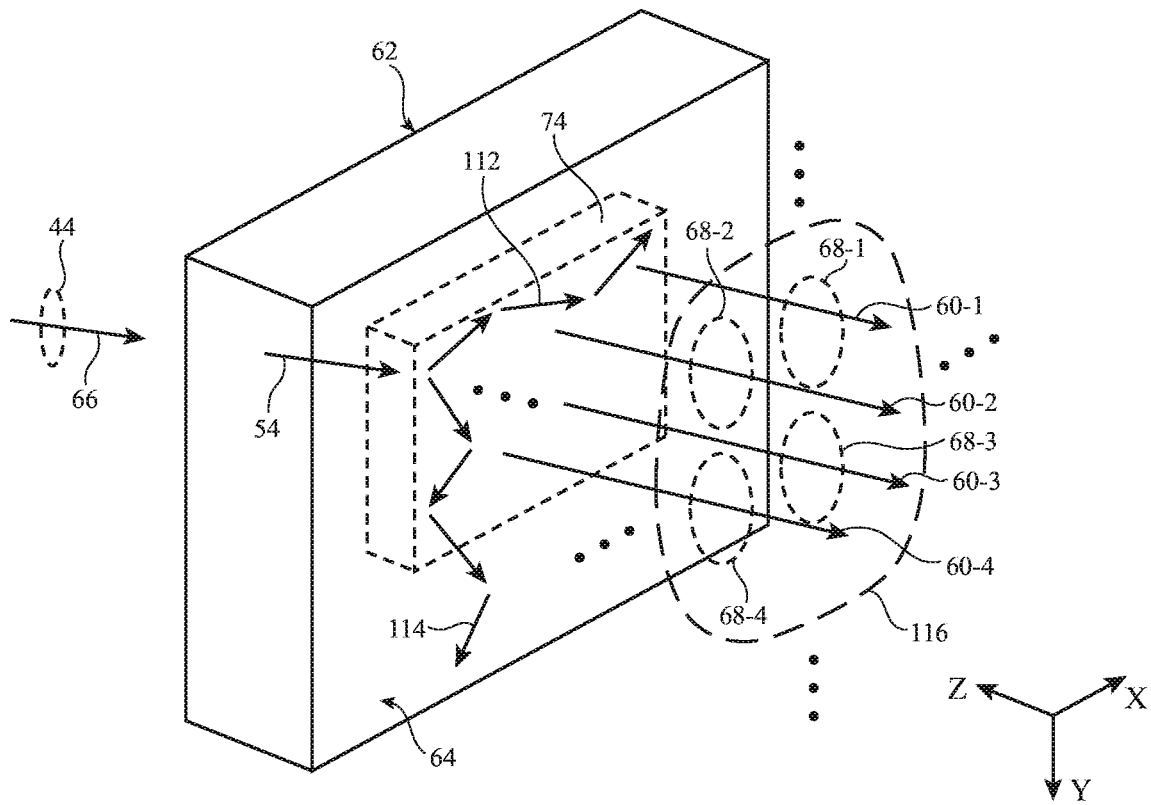
FIG. 15 is a perspective view showing how a waveguide of the types shown in FIGS. 5-14 may fill an eye box with light across two dimensions in accordance with an embodiment.

FIG. 15 is a perspective view of waveguide 48 having beam splitter structures 74. As shown in FIG. 15, image light 66 may be coupled into waveguide 48 and corresponding light 54 may propagate down the length of waveguide 48 (e.g., parallel to the X-axis of FIG. 15). When light 54 hits beam splitter structures 74, beam splitter structures 74 may generate reflections in a first direction (e.g., a horizontal direction parallel to the X-axis), as shown by arrows 112, and in a second direction (e.g., a vertical direction parallel to the Y-axis), as shown by arrows 114. The reflections in the second direction may continue to occur as the light propagates in the first direction (e.g., so that light is reflected along the two-dimensional lateral surface of the beam splitter structures). These reflections may produce output beams 60 (e.g., output beams 60-1, 60-2, 60-3, and 60-4 shown in FIG. 15) across the two-dimensional lateral area of beam splitter structures 74. Each output beam 60 may have a corresponding beam area 68 (e.g., beam areas 68-1, 68-2, 68-3, and 68-4 shown in FIG. 15).

Cumulatively, beam areas 68 may provide uniform light intensity across collective area 116 in two dimensions (e.g., within the X-Y plane). This may allow the output light to fill the two-dimensional area 72 of eye box 70 with uniform intensity. In this way, beam splitter structures 74 may serve to expand the image light output from waveguide 48 in two dimensions (relative to the arrangement of FIG. 14) to fill a relatively large eye box with light of uniform intensity. This may, for example, allow the user to rotate or move their eyes when looking into the eye box without perceiving drops in image light intensity, even for a relatively large field of view.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

As described above, one aspect of the present technology is the gathering and use of data available from various sources to improve the delivery of images to users, perform gaze tracking operations, and/or to perform other display-related operations. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to track a user's gaze to update displayed images and/or to perform other desired display operations. Accordingly, use of such personal information data enables users to view updated display images. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gaze tracking, the present technology can be configured to allow users to select to "opt in" or "opt out" of participation in the collection of personal information data during registration for services or anytime thereafter. In another example, users can select not to perform gaze tracking or other operations that gather personal information data. In yet another example, users can select to limit the length of time gaze tracking is performed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, display images based on non-personal information data or a bare minimum amount of personal information, such as the content being requested by the device associated with a user, other non-personal information available to the display system, or publicly available information.

The foregoing is merely illustrative and various modifications can be made to the described embodiments. The foregoing embodiments may be implemented individually or in any combination.

What is claimed is:

1. An electronic device comprising:
   a display configured to emit light;
   a waveguide having a first surface and a second surface opposite and parallel to the first surface and having no air gap between the first surface and the second surface;
   an optical coupler configured to couple the light emitted by the display into the waveguide;
   a first beam splitter embedded in the waveguide and extending parallel to the first surface; and
   a second beam splitter embedded in the waveguide and extending parallel to the second surface, wherein the second beam splitter at least partially overlaps the first beam splitter, the first beam splitter is configured to transmit a first portion of the light at a wavelength to the second beam splitter and is configured to reflect a second portion of the light at the wavelength, and the second beam splitter is configured to partially reflect the first portion of the light transmitted by the first beam splitter.

2. The electronic device defined in claim 1, wherein the waveguide comprises first and second transparent substrates, the first beam splitter is disposed on the first transparent substrate, the second beam splitter is disposed on the second transparent substrate, the second transparent substrate is mounted to the first transparent substrate, and the second transparent substrate is interposed between the first and second beam splitters.

3. The electronic device defined in claim 2, wherein the waveguide further comprises a third transparent substrate mounted to the second transparent substrate, wherein the second beam splitter is interposed between the second and third transparent substrates.

4. The electronic device defined in claim 2, further comprising:
   a third beam splitter embedded in the waveguide, wherein the third beam splitter is disposed on the first transparent substrate and is laterally displaced from the first beam splitter.

5. The electronic device defined in claim 1, wherein the second beam splitter completely overlaps the first beam splitter.

6. The electronic device defined in claim 1, further comprising:
   a third beam splitter embedded in the waveguide, wherein the third beam splitter at least partially overlaps the second beam splitter.

7. The electronic device defined in claim 6, wherein the third beam splitter completely overlaps the second beam splitter.

8. The electronic device defined in claim 6, wherein the third beam splitter completely overlaps the first and second beam splitters.

9. The electronic device defined in claim 1, wherein the first and second beam splitters each comprise a metallic coating.

10. The electronic device defined in claim 1, wherein the first and second beam splitters each comprise a dielectric coating.

11. The electronic device defined in claim 1, wherein the first and second beam splitters each comprise a surface hologram.

12. The electronic device defined in claim 1, wherein the first beam splitter has opposing first and second ends, a first reflection coefficient at the first end, and a second reflection coefficient at the second end that is different than the first reflection coefficient.

13. The electronic device defined in claim 12, wherein the first reflection coefficient is greater than the second reflection coefficient.

14. The electronic device defined in claim 13, wherein the first beam splitter comprises a first region having the first reflection coefficient, a second region having the second reflection coefficient, and a third region having a third reflection coefficient that is less than the first reflection coefficient and greater than the second reflection coefficient, the third region being interposed between the first and second regions.

15. The electronic device defined in claim 13, wherein the first beam splitter has a continuously variable reflection coefficient that varies from the first reflection coefficient at the first end to the second reflection coefficient at the second end.

16. The electronic device of claim 1, further comprising an additional optical coupler configured to couple the light out of the display after reflection of the light by the second beam splitter.

17. The electronic device of claim 16, wherein the additional optical coupler comprises a diffraction grating and wherein the diffraction grating comprises a volume hologram.

* * * * *